June 14, 1938.  J. DLESK  2,120,695
GAS VALVE MECHANISM
Filed Jan. 11, 1935
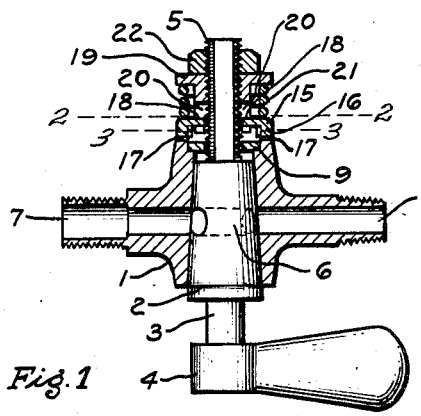
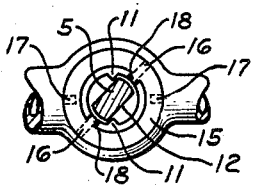
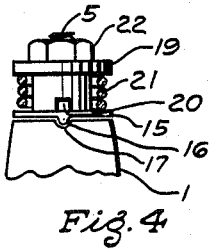
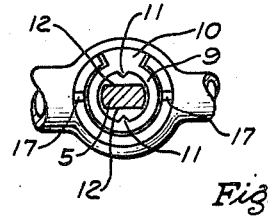
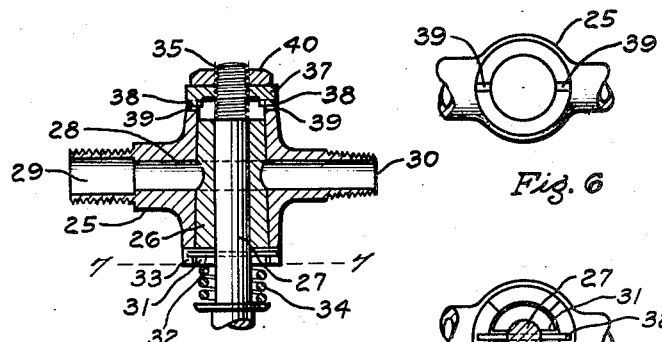
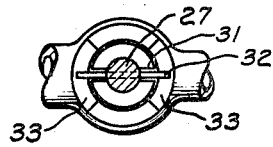
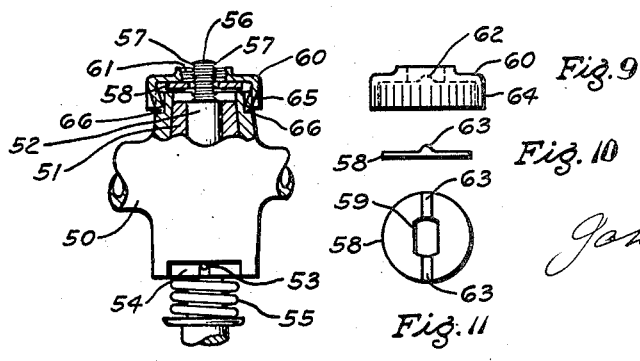
John Dlesk.
INVENTOR.

Patented June 14, 1938

2,120,695

UNITED STATES PATENT OFFICE 2,120,695

GAS VALVE MECHANISM

John Dlesk, Berwyn, Ill., assignor to Imperial Brass Manufacturing Company, Chicago, Ill.

Application January 11, 1935, Serial No. 1,279

3 Claims. (Cl. 251—163)

My invention relates to valves and more particularly to hand operated gas cocks for use on ranges, space heaters and similar gas burning appliances.

The general object of my invention is to provide a gas valve with a temporary intermediate stop readily adjustable to any intermediate rate of gas flow through the valve.

Another object is to provide a gas valve having a click stop for setting and indicating a low flame position which can be adjusted to operate at any point in the range between full off and full on position.

Another object is to provide on a gas cock of the customary type a simplified device which can be adjusted in place to produce a click stop for any degree of opening.

A further object is to provide on a gas cock of the customary type a click stop device composed of a single disc interengaging with the body by means of slots and lugs, which can be set in position on the stem so that the click stop may be adjusted to operate at any desired flame height.

A still further object is to provide on a gas cock of the customary type a temporary stop device composed of a member which can be affixed to the stem in any one of several positions corresponding respectively to various degrees of opening and which simultaneously serves to secure the movable parts of the cock in assembled position.

Another object is to provide a gas cock equipped with a temporary stop which can be adjusted to any partial opening position, composed of an axially slidable disc interengaging with a retaining ring which in turn can be clamped to the body of the cock, permitting the stem to turn threadably through it with a minimum of resistance when opening and closing the cock.

In pursuance of the foregoing objects I aim to provide an adjustable temporary stop which can be attached to valves of any type and which permits the valve to work smoothly and unresistingly. Further objects and advantages will be more apparent as the description proceeds taken in connection with the accompanying drawing which forms a part of this specification.

Fig. 1 denotes a section of gas cock of the ordinary plug type equipped with one form of the stop device.

Fig. 2 is a section on line 2—2 of Fig. 1 with the stop device removed.

Fig. 3 is a section on 3—3 of Fig. 1 with the sleeve and spring removed.

Fig. 4 is a view at right angles to Fig. 1.

Fig. 5 is a section through a plug type gas cock showing a modification of the device.

Fig. 6 is a view of the top of the body of Fig. 5.

Fig. 7 is a view on line 7—7 of Fig. 5.

Fig. 8 is a part section of a cock showing the novel clamping means.

Fig. 9 shows the retaining ring of Fig. 8.

Figs. 10 and 11 are views of the slidable disc in Fig. 8.

For the purposes of disclosure, I have illustrated in the drawing and shall hereinafter describe in detail the preferred embodiment of my invention together with several modifications with the understanding that I do not intend to limit my invention to the particular constructions and arrangements shown, it being contemplated that various changes may be made by those skilled in the art without departing from the spirit and scope of the appended claims.

The need has been felt for gas cocks and valves provided with one or more intermediate adjustments between off and on position which may be definitely set by the user, guided by some indication such as a click when turning the handle. Attempts have been made to secure such an adjustment but they have been invariably directed to a redesign of the valve to include a variety and multiplicity of attachments and passages necessary for the successful operation of their methods. Passages and needle valve systems have been tried and multiple ports have been used in an effort to solve the problems and, while they have been more or less successful in the mechanics of their operation, have resulted necessarily in adding to the complexity and cost of the article.

In providing a gas cock with an adjustable intermediate stop I have constructed a device with a minimum possible number of parts, as well as one which can be readily fitted to cocks and valves now in regular use and which is also easily adjustable and certain of operation.

My invention consists primarily of a spring pressed disc which, by the interengagement of its lugs with notches in a stationary part, forms a click stop which can be made to be operated for any desired amount of valve opening by rotating the disc around the stem to the desired position and there securing it.

As shown in the drawing 1 is a cock body having a rotating part or plug 2. At the lower end of 2 is an extension 3 to which is attached a handle 4 and at the upper end is a threaded shank 5. A passage 6 through the plug or rotor registers with the passages 7 and 8 in the body. The plug can be rotated so that passage 6 is in only partial register permitting less than the full amount of gas to flow through and thus set an attached burner at a condition of low or simmering flame. The cock is equipped with the customary stop at open and at closed position consisting of a ring 9 with a key lug 10 and stop lugs 11. The key lug 10 sets in a slot in the body to prevent rotation of the ring. The shank 5 which is milled to present two flat faces 12 passes through the ring and when rotated is stopped in either direction by contact of the flat faces against the stop lugs.

Above the ring is a disc 15 with depending lugs or beads 16 constructed to fit into the recesses, here shown as slots 17 in the body. Extending radially inward of the disc are the protrusions 18. A sleeve member 19 is screw threaded to the shank 5 and contains slots 20 adapted to loosely receive the protrusions 18. A spring 21 forces the disc 15 against the body and a lock nut 22 secures the parts in position.

In adjusting the device the cock may be opened to the point at which it is desired to establish the temporary stop which can be done when the cock is in operative position on a range or heater when the height of the flame can actually be observed. The sleeve 19 is then turned around carrying with it the rotatively attached disc 15, until the lugs 16 engage with the slots 17. The nut 22 is screwed down and locks the sleeve and disc in that position on the shank. Now when the plug is rotated the sleeve is also rotated and when the lugs are thus forced out of the slots the disc 15 is forced back against the spring 21. The plug is then moved toward open or closed position as the case may be. Hence when the plug is again rotated past the described position of partial opening the lugs and slots will interengage with a click and establish a definite partially open position. It may be seen that the notches may be placed arbitrarily in any position on the body because when the adjustment is made this is taken into consideration. It may be further noted that the click or temporary stop may be set for any place whatever between the off and on positions. The slot 20 in sleeve 19 is elongated to permit axial movement of the disc 15 during operation and to allow for various adjustments of spring tension.

In the modification shown in Fig. 5 a body 25 has rotating within it the plug 26 which has a stem 27 extending completely through it and terminating in a threaded shank 35. A passage 28 moulded in the outer surface of the plug registers with the passages 29 and 30 of the body. The plug has a deeply milled slot 31 through which is inserted a stop pin 32, extending through the stem and engaging in the slots 33 in the body. The plug is spring pressed into position by the spring 34 and the depth of slot 31 provides excess of contact for the pin as the plug wears and is pressed deeper into the body.

On the top side is a screwthreaded disc 37 with depending lugs 38 which engage in the slots 39 of the body 25, and which is locked in place by the lock nut 40. The setting of this adjustment is similar to that of the preferred form in that the plug and stem having been positioned for the desired opening, the disc is screwed down until the lugs interengage the notches at which point the lock nut is tightened into place. When the plug is turned the lugs and slots disengage and act through the stem against the spring. Similarly on again passing the engaging point the spring forces them into a temporary or click contact.

Still another modified form is shown in Fig. 8 wherein a body 50 houses a rotating part or plug 51 through which extends a stem 52. A stop pin 53 keys the plug to the stem and rests in the slot 54 in the body to stop full rotation beyond full off position and full on position. The plug is pressed into place by a spring 55. Extending upwards the stem 52 terminates in a threaded portion 56 with flattened sides 57. A disc 58 is broached as at 59 to slide axially along the threaded portion 56 and to rotate with it. A cap piece 60 is screwthreaded at 61 to fit the portion 56. Within the cap are slots 62 adapted to engage with the lugs 63 on the disc. At the sides 64 of the cap are slits dividing it into a plurality of sections in the nature of teeth 65, any of which may be punched into engagement with vertical incisions or slots 66 in the body. By this means the disc 58 becomes the relatively fixed portion and the cap the adjustable portion. When adjusting the plug for the desired rate of gas flow the cap is rotated until the notch and lugs coincide, at which point the teeth adjacent the slots are driven into them. Since the rotation is limited by the stop pin there is no opportunity for the stem to screw out of the cap. The disc rests flush against the top of the body and, when rotated, disengages from the cap and pushes it slightly upward against the pressure of spring 55. There is provision for axial movement of the cap a distance corresponding to the depth of the engaging lugs without danger of disengaging. The cap thus forms simultaneously an adjusting means holding the valve parts together and a retaining means which dispenses with the customary tightening nut. It is further evident that the cap could be advantageously used on valves lacking the temporary stop, where ease of working is desirable.

I have thus provided an adjustable temporary stop for use on commercial types of gas valves and cocks which is reduced to a minimum number of parts, and which can be conveniently adjusted at any time while the valve is in place or previous to attachment. One skilled in the art could readily devise additional adjustments working on the same principle for a plurality of click-on intermediate positions. Tapering of the ports in the rotating piece or plug would further facilitate the smoothness of working but it is regarded as unessential to the principle of this disclosure. Having thus described my invention what I claim and wish to secure by Letters Patent is:

1. A gas cock comprising a body and a plug, a stem keyed to said plug and passing therethrough, a gas passage thru said cock, said plug, said body and said stem in resilient interengagement, said plug spring pressed against said body, a nut means on said stem yieldably engageable with said body by means of lugs and recesses, lock nut means on said stem operable with said nut means to clamp said means jointly to said stem in any preselected position intermediate of on and off positions of the cock, said stem keyed to said plug by pin and slot means allowing for axial movement of said stem with respect to said body, slots in said body for reception of said pin determinative of stop positions of said plug at on and off positions.

2. A gas cock comprising a body and a plug, a stem keyed to said plug and passing therethrough, a gas passage thru said cock, said plug, said body and said stem resiliently interengaged, a nut means on said stem yieldably interengageable with said body, locking means on said stem operable with said nut means to lock said means jointly to said stem in any preselected position intermediate of on and off positions of the cock.

3. A gas valve comprising a body and a rotor member, a stem rotatable with said member and passing therethrough, a gas passage thru said valve, said stem, said body and said rotor member resiliently interconnected, means on said stem releasably engageable with said body, locking means on said stem operable with said engageable means to clamp said engageable means to said stem in any preselected position of partial capacity.

JOHN DLESK.